United States Patent
Hosoi et al.

(10) Patent No.: US 10,134,264 B2
(45) Date of Patent: Nov. 20, 2018

(54) EMERGENCY REPORT APPARATUS

(71) Applicant: DENSO CORPORATION, Kariya, Aichi-pref. (JP)

(72) Inventors: Toshihiro Hosoi, Kariya (JP); Shinichi Yokoi, Kariya (JP)

(73) Assignee: DENSO CORPORATION, Kariya, Aichi (JP)

( * ) Notice: Subject to any disclaimer, the term of this patent is extended or adjusted under 35 U.S.C. 154(b) by 0 days.

(21) Appl. No.: 15/524,428

(22) PCT Filed: Nov. 23, 2015

(86) PCT No.: PCT/JP2015/005813
§ 371 (c)(1),
(2) Date: May 4, 2017

(87) PCT Pub. No.: WO2016/088323
PCT Pub. Date: Jun. 9, 2016

(65) Prior Publication Data
US 2018/0089987 A1    Mar. 29, 2018

(30) Foreign Application Priority Data

Dec. 4, 2014   (JP) .................. 2014-246145
Sep. 29, 2015  (JP) .................. 2015-191433

(51) Int. Cl.
*G08B 25/01*     (2006.01)
*H04W 4/90*      (2018.01)
(Continued)

(52) U.S. Cl.
CPC .......... *G08B 25/016* (2013.01); *G08B 25/08* (2013.01); *H04L 27/0008* (2013.01);
(Continued)

(58) Field of Classification Search
CPC ...... G07C 5/008; G07C 5/085; G07C 5/0808; G07C 5/00; G07C 5/08; G07C 5/0841;
(Continued)

(56) References Cited

U.S. PATENT DOCUMENTS 6,337,641 B1 * 1/2002 Yoshioka .............. B60Q 1/52
340/988
2012/0253821 A1 * 10/2012 Kamiya .............. G10L 99/00
704/270.1

FOREIGN PATENT DOCUMENTS

JP   H03283800 A   12/1991
JP   H11220526 A   8/1999
(Continued)

*Primary Examiner* — Kwasi Karikari
(74) *Attorney, Agent, or Firm* — Harness, Dickey & Pierce, P.L.C.

(57) ABSTRACT

In an emergency report apparatus, diagnostic data is modulated based on a preselected diagnostic modulation method by using a diagnostic carrier wave having a carrier wave frequency that is set within a range of frequencies detectable by a vehicle-mounted voice input instrument and is outside a voice band. A diagnostic electric signal is outputted to a voice output instrument. Demodulated data is generated by demodulating an input voice electric signal being a voice electric signal representing a voice detected by the voice input instrument based on a preselected diagnostic demodulation method. It is determines whether the demodulated data includes data that matches the diagnostic data.

6 Claims, 4 Drawing Sheets

(51) Int. Cl.
  *G08B 25/08*  (2006.01)
  *H04L 27/10*  (2006.01)
  *H04M 9/08*  (2006.01)
  *H04M 11/04*  (2006.01)
  *H04L 27/00*  (2006.01)
  *H04L 27/02*  (2006.01)

(52) U.S. Cl.
  CPC ............ *H04L 27/10* (2013.01); *H04M 9/082* (2013.01); *H04M 11/04* (2013.01); *H04W 4/90* (2018.02); *H04L 27/02* (2013.01)

(58) Field of Classification Search
  CPC ....... G07C 5/006; G07C 5/0816; H04L 67/12; H04L 67/306; H04W 60/00; H04W 60/06; H04W 76/007; H04W 4/027
  See application file for complete search history.

(56) References Cited

FOREIGN PATENT DOCUMENTS

| | | | |
|---|---|---|---|
| JP | 2001223819 A | 8/2001 |
| JP | 2002127858 A | 5/2002 |
| JP | 2002170183 A | 6/2002 |
| JP | 2002345091 A | 11/2002 |
| JP | 2012175179 A | 9/2012 |
| JP | 2013055545 A | 3/2013 |

\* cited by examiner

EMERGENCY REPORT APPARATUS

CROSS REFERENCE TO RELATED APPLICATIONS

This application is a U.S. National Phase Application under 35 U.S.C. 371 of International Application No. PCT/JP2015/005813 filed on Nov. 23, 2015 and published in Japanese as WO 2016/088323 A1 on Jun. 9, 2016. This application is based on and claims the benefit of priority from Japanese Patent Application No. 2014-246145 filed on Dec. 4, 2014 and Japanese Patent Application No. 2015-191433 filed on Sep. 29, 2015. The entire disclosures of all of the above applications are incorporated herein by reference.

TECHNICAL FIELD

The present disclosure relates to an emergency report apparatus that makes an emergency report in the event of an emergency in a vehicle.

BACKGROUND ART

There is conventionally known an emergency report apparatus that, in the event of an emergency in a vehicle, establishes data communication with an emergency report center through a wide-area wireless communication network (e.g., a mobile phone communication network) in order to let an occupant of the vehicle converse with an operator at the emergency report center (refer to Patent Literature 1).

However, in the event of an emergency where the vehicle is damaged, loudspeakers in the vehicle may become defective. If the loudspeakers are defective, the occupant of the vehicle is unable to converse with the operator at the emergency report center. In order to avoid such a contingency, there is a well-known technology for providing the vehicle with a backup loudspeaker in addition to normally used main loudspeakers and using the backup loudspeaker to output a voice message from the operator at the emergency report center when the main loudspeakers are defective.

A well-known method of diagnosing a defect in a loudspeaker is to output a DTMF (Dual-Tone Multi-Frequency) sound or other diagnostic sound from the loudspeaker and detect the outputted diagnostic sound with a microphone.

PRIOR ART LITERATURES

Patent Literature

Patent Literature 1: JP 2013-055545 A

SUMMARY OF INVENTION

Using the method of outputting the DTMF sound or other diagnostic sound from a loudspeaker makes the diagnostic sound hearable by the occupant of the vehicle and may give an uncomfortable feeling to the occupant.

It is an object of the present disclosure to reduce the possibility of giving an uncomfortable feeling to an occupant of a vehicle when a vehicle-mounted loudspeaker is diagnosed.

According to a first example of the present disclosure, an emergency report apparatus mounted in a vehicle establishes wireless data communication in an event of an emergency in the vehicle to enable an occupant of the vehicle to converse with an emergency report center. The emergency report apparatus includes a modulation section, a demodulator, and a diagnostic data determination section.

The modulation section modulates preselected diagnostic data based on a preselected diagnostic modulation method by using a diagnostic carrier wave having a preselected carrier wave frequency that is within a range of frequencies detectable by a voice input instrument and is outside a voice band, the voice input instrument being mounted in the vehicle. The modulation section then outputs a diagnostic electric signal to a voice output instrument mounted in the vehicle to output a voice. The diagnostic electric signal is obtained by modulating the diagnostic data. The demodulator generates demodulated data by demodulating an input voice electric signal being a voice electric signal representing a voice detected by the voice input instrument based on a preselected diagnostic demodulation method. The diagnostic data determination section determines whether the demodulated data generated by the demodulator includes data that matches the diagnostic data.

The emergency report apparatus according to the first example enables the vehicle-mounted voice output instrument to output a diagnostic sound represented by the diagnostic electric signal by outputting the diagnostic electric signal to the voice output instrument. When the vehicle-mounted voice input instrument detects the diagnostic sound, the emergency report apparatus according to the first example can determine that the voice output instrument is nondefective. Whether the diagnostic sound is detected by the voice input instrument can be determined depending on whether data included in the demodulated data matches the diagnostic data.

Further, in the emergency report apparatus according to the first example, the diagnostic electric signal outputted to the voice output instrument is modulated by the diagnostic carrier wave, which is a carrier wave having the carrier wave frequency outside the voice band. Therefore, when the diagnostic sound representative of the diagnostic electric signal is outputted from the voice output instrument, the diagnostic sound is hardly hearable by the occupant of the vehicle because the diagnostic sound includes a frequency outside the voice band. Consequently, diagnosing the voice output instrument is unlikely to give an uncomfortable feeling to the occupant of the vehicle.

Furthermore, a component of the diagnostic electric signal that has the carrier wave frequency is used as a carrier wave. Thus, the output level of such a component can be decreased. Consequently, diagnosing the voice output instrument is more unlikely to give an uncomfortable feeling to the occupant of the vehicle.

According to a second example of the present disclosure, an emergency report apparatus mounted in a vehicle establishes wireless data communication in an event of an emergency in the vehicle to enable an occupant of the vehicle to converse with an emergency report center. The emergency report apparatus includes a notification voice output instrument and a notification voice determination section.

The notification voice output instrument outputs a voice electric signal to a voice output instrument mounted in the vehicle to output a voice while the emergency report apparatus is calling the emergency report center in order to enable the occupant to converse with the emergency report center. The voice electric signal represents a call notification voice adapted to notify the occupant that the emergency report center is being called. The notification voice determination section determines whether the call notification voice is included in a voice detected by a voice input instrument mounted in the vehicle.

The emergency report apparatus according to the second example enables the vehicle-mounted voice output instrument to output the call notification voice by outputting the voice electric signal representative of the call notification voice to the voice output instrument. When the vehicle-mounted voice input instrument detects the call notification voice, the emergency report apparatus according to the second example can determine that the voice output instrument is nondefective.

The call notification voice notifies the occupant of the vehicle that the emergency report center is being called, and does not give an uncomfortable feeling to the occupant of the vehicle. Consequently, the emergency report apparatus according to the second example reduces the possibility of giving an uncomfortable feeling to the occupant of the vehicle when the vehicle-mounted voice output instrument is diagnosed.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

A first embodiment of the present disclosure will now be described with reference to the accompanying drawings. An emergency report system 1 is mounted in a vehicle, and includes a microphone 2, a main loudspeaker 3, a backup loudspeaker 4, an audio instrument 5, an emergency report switch 6, and an emergency report apparatus 7, as in FIG. 1. In the drawings, the term "emergency report" may be abbreviated to ER.

Figure 1:
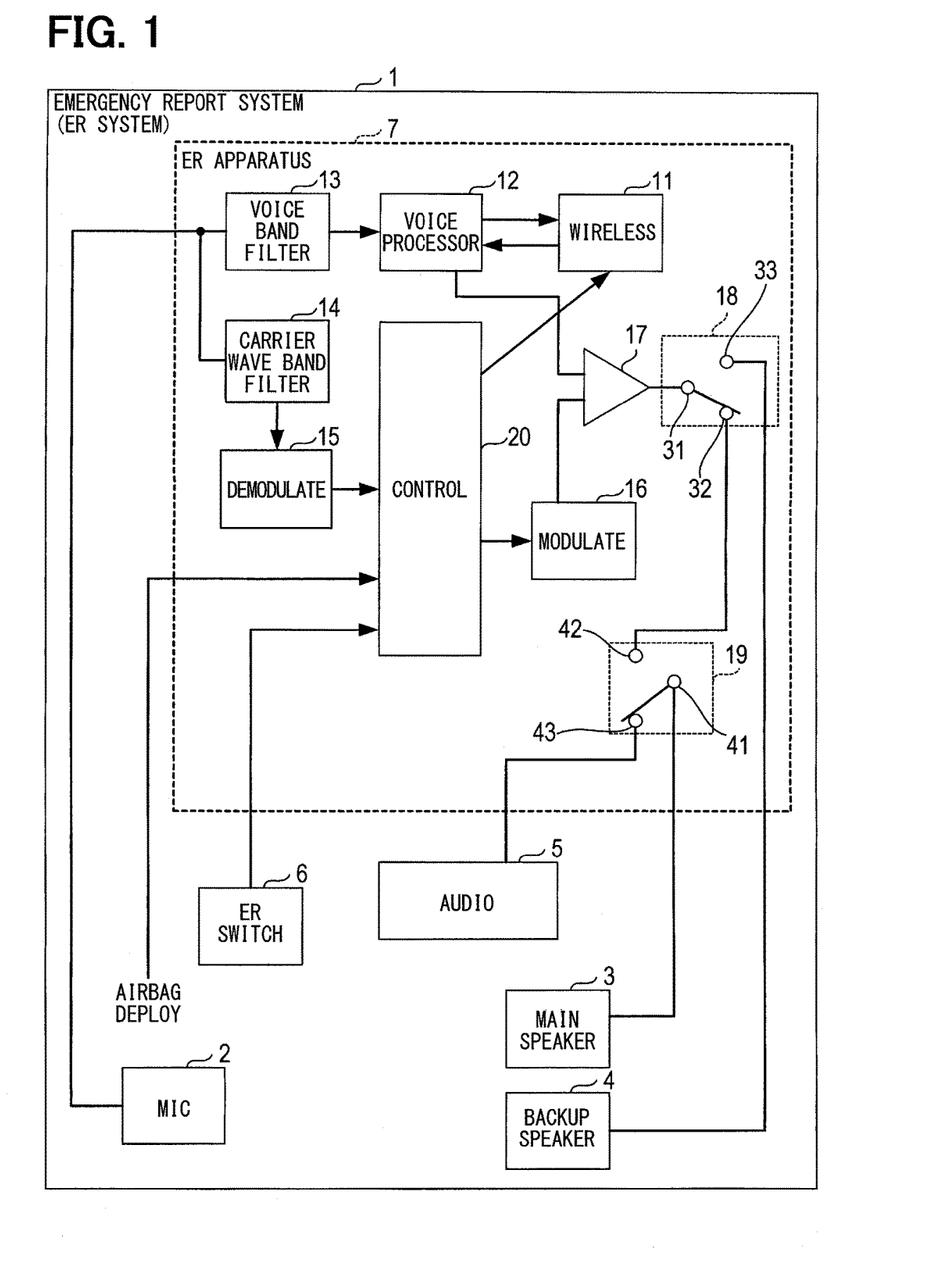
FIG. 1 is a block diagram illustrating a configuration of an emergency report system according to a first embodiment.

The microphone 2 is used to input a voice and installed in a vehicle compartment. The microphone 2 converts the inputted voice to an electric signal (hereinafter referred to as the voice electric signal) and outputs the electric signal. The main loudspeaker 3 and the backup loudspeaker 4 are used to output a voice and installed in the vehicle compartment. The main loudspeaker 3 and the backup loudspeaker 4 convert the inputted voice electric signal to a voice and output the voice.

The audio instrument 5 incorporates an AM/FM tuner and a CD player, and outputs a voice electric signal generated by the AM/FM tuner or the CD player. The audio instrument 5 includes an external input terminal, and outputs a voice electric signal inputted from the external input terminal.

The emergency report switch 6 is manipulated by the occupant of the vehicle in order to make an emergency report and installed in the vehicle compartment. The emergency report apparatus 7 includes a wireless communicator 11, a voice processor 12, a voice band filter 13, a carrier wave band filter 14, a demodulator 15, a modulator 16, an amplifier 17, selector switches 18, 19, and a controller 20.

The wireless communicator 11 establishes wireless data communication with an emergency report center (unshown) through a wide-area wireless communication network (e.g., a mobile phone communication network). The voice processor 12 generates voice data by receiving a voice electric signal inputted from the microphone 2 and converting the voice electric signal to a digital signal, and then outputs the generated voice data to the wireless communicator 11. Further, the voice processor 12 generates a voice electric signal by receiving voice data inputted from the wireless communicator 11 and converting the voice data to an analog signal, and then outputs the generated voice electric signal to the amplifier 17.

The voice band filter 13 receives a voice electric signal inputted from the microphone 2, eliminates components outside a voice band from the voice electric signal, and outputs the resultant voice electric signal to the voice processor 12. The carrier wave band filter 14 receives a voice electric signal inputted from the microphone 2, eliminates components outside carrier wave bands (a 20 Hz to 50 Hz band and an 18 kHz to 20 kHz band in the embodiment) from the voice electric signal, and outputs the resultant voice electric signal to the demodulator 15.

The demodulator 15 receives a voice electric signal inputted from the carrier wave band filter 14, demodulates the voice electric signal by a preselected diagnostic demodulation method to generate demodulated data, and outputs the demodulated data to the controller 20. The term "diagnostic" denotes a process of determining whether a target instrument is normal or defective.

The modulator 16 modulates loudspeaker diagnostic digital data, which is prepared for the diagnosis of a loudspeaker, by a preselected diagnostic modulation method (e.g., an AM method or an FM method) to generate a modulated electric signal, and outputs the modulated electric signal to the amplifier 17. When modulating the loudspeaker diagnostic digital data, the modulator 16 uses a carrier wave having a preselected carrier wave frequency (e.g., 19 kHz in the embodiment) that is included in the above-mentioned carrier wave bands.

The amplifier 17 receives a signal inputted from the voice processor 12 and the modulator 16, amplifies the received signal, and outputs the amplified signal. The selector switch 18 includes connection terminals 31, 32, 33. The connection terminal 31 is connected to an output terminal of the amplifier 17. The connection terminal 32 is connected to the selector switch 19. The connection terminal 33 is connected to the backup loudspeaker 4. Based on a selection signal outputted from the controller 20, the selector switch 18 switches to either a first connection state or a second connection state. In the first connection state, the connection terminal 31 is connected to the connection terminal 32. In the second connection state, the connection terminal 31 is connected to the connection terminal 33.

The selector switch 19 includes connection terminals 41, 42, 43. The connection terminal 41 is connected to the main loudspeaker 3. The connection terminal 42 is connected to the connection terminal 32 of the selector switch 18. The connection terminal 43 is connected to an output terminal of the audio instrument 5. Based on a selection signal outputted from the controller 20, the selector switch 19 switches to either a third connection state or a fourth connection state. In the third connection state, the connection terminal 41 is connected to the connection terminal 42. In the fourth connection state, the connection terminal 41 is connected to the connection terminal 43.

The controller 20 may be referred to as the electronic control unit. In the embodiment, the controller 20 is mainly formed of a well-known microcomputer that includes, for example, a CPU, a ROM, a RAM, an I/O, and a bus line connecting these components. When the CPU executes a process based on a program stored in the ROM, the controller 20 controls the wireless communicator 11, the modulator 16, and the selector switches 18, 19. Functions exercised by the controller 20 can be implemented by a program as mentioned. Further, some or all of the functions can be implemented by hardware components.

Further, an emergency report switch signal indicating whether the emergency report switch 6 is manipulated is inputted from the emergency report switch 6 to the controller 20. Furthermore, an airbag deployment signal is inputted from an airbag apparatus (unshown) to the controller 20.

When a predefined emergency report start condition is established in the emergency report system 1, the emergency report apparatus 7 causes the wireless communicator 11 to make an emergency report. In the embodiment, an emergency report sequence starts when at least either a first start condition or a second start condition is established. The first start condition is established when the emergency report switch 6 is manipulated. Whether the emergency report switch 6 is manipulated is determined based on the emergency report switch signal from the emergency report switch 6. The second start condition is established when the airbag deployment signal is inputted to the controller 20.

The emergency report sequence includes two processes. One process conveys, for example, vehicle position information indicative of the present position of the vehicle to the emergency report center through the wireless communicator 11. The other process permits the wireless communicator 11 to establish wireless data communication in order to let the occupant of the vehicle converse with an operator at the emergency report center.

The emergency report apparatus 7 enables the occupant of the vehicle to have a hands-free conversation with the operator at the emergency report center by capturing a voice uttered by the occupant of the vehicle with the microphone 2 and outputting a voice uttered by the operator from the main loudspeaker 3 or the backup loudspeaker 4.

Further, the controller 20 of the emergency report apparatus 7 performs a loudspeaker diagnostic process. The steps of the loudspeaker diagnostic process will now be described with reference to the flowchart of FIG. 2, which illustrates the loudspeaker diagnostic process. The loudspeaker diagnostic process starts immediately after the emergency report apparatus 7 is activated.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, unit, or a specific name, (e.g., detection section being referred to as a detection device, a detection module, a detection unit, or a detector). Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

Figure 2:
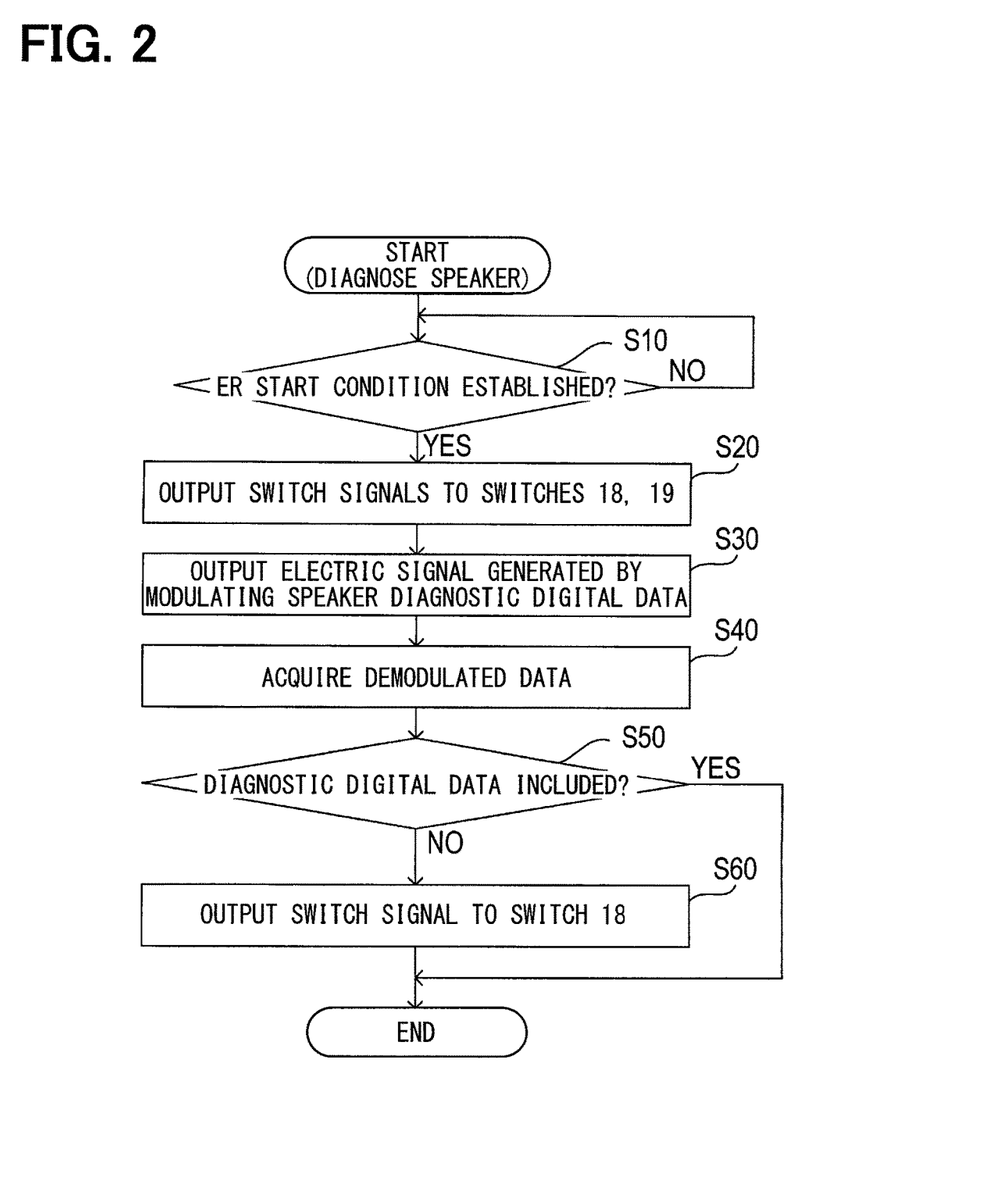
FIG. 2 is a flowchart illustrating a loudspeaker diagnostic process according to the first embodiment.

When the loudspeaker diagnostic process starts, the controller 20 first determines in S10 whether the above-described emergency report start condition is established. If the emergency report start condition is not established (S10: NO), S10 is repeated until the emergency report start condition is established. When the emergency report start condition is established (S10: YES), processing proceeds to S20. In S20, a selection signal indicative of the first connection state is outputted to the selector switch 18, and a selection signal indicative of the third connection state is outputted to the selector switch 19. The selector switch 18 is then connected to the connection terminal 31 and to the connection terminal 32. Further, the selector switch 19 is connected to the connection terminal 41 and to the connection terminal 42. The selector switch 18 is placed in the first connection state immediately after the emergency report apparatus 7 is activated. Further, the selector switch 19 is placed in the fourth connection state immediately after the emergency report apparatus 7 is activated.

In S30, the modulator 16 outputs an electric signal that is generated by modulating the loudspeaker diagnostic digital data. A voice representing the loudspeaker diagnostic digital data is then outputted from the main loudspeaker 3.

In S40, the demodulated data is acquired from the demodulator 15. In S50, it is determined whether the demodulated data includes the loudspeaker diagnostic digital data. If the loudspeaker diagnostic digital data is included in the demodulated data (S50: YES), the loudspeaker diagnostic process terminates. Consequently, when the wireless communicator 11 establishes wireless data communication to let the occupant of the vehicle converse with the operator at the emergency report center, the main loudspeaker 3 outputs a voice uttered by the operator.

By contrast, if the loudspeaker diagnostic digital data is not included in the demodulated data (S50: NO), processing proceeds to S60. In S60, a selection signal indicative of the second connection state is outputted to the selector switch 18. The selector switch 18 is then connected to the connection terminal 31 and to the connection terminal 33. Consequently, when the wireless communicator 11 establishes wireless data communication to let the occupant of the vehicle converse with the operator at the emergency report center, the backup loudspeaker 4 outputs a voice uttered by the operator.

The emergency report apparatus 7 is mounted in the vehicle. In the event of an emergency in the vehicle, the emergency report apparatus 7 establishes wireless data communication so that the occupant of the vehicle can converse with the emergency report center.

The emergency report apparatus 7 uses a diagnostic carrier wave to modulate the preselected loudspeaker diagnostic digital data by the preselected diagnostic modulation method (S30). The diagnostic carrier wave has a carrier wave frequency that is within a range of frequencies detectable by the vehicle-mounted microphone 2 and is outside the voice band. The emergency report apparatus 7 then outputs a diagnostic electric signal, which is obtained by modulating the loudspeaker diagnostic digital data, to the main loudspeaker 3 (S30), which is mounted in the vehicle to output a voice.

The demodulator 15 of the emergency report apparatus 7 generates demodulated data by demodulating an input voice electric signal by the preselected diagnostic demodulation method. The input voice electric signal represents a voice detected by the microphone 2. The emergency report apparatus 7 then determines whether the demodulated data generated by the demodulator 15 includes data that matches the loudspeaker diagnostic digital data (S50).

The emergency report apparatus 7 can output a diagnostic sound representative of the diagnostic electric signal from the vehicle-mounted main loudspeaker 3 by outputting the diagnostic electric signal to the main loudspeaker 3. Further, when the vehicle-mounted microphone 2 detects the diagnostic sound, the emergency report apparatus 7 can detect that the main loudspeaker 3 is nondefective. Whether the diagnostic sound is detected by the microphone 2 can be determined depending on whether the demodulated data includes data that matches the loudspeaker diagnostic digital data.

Further, in the emergency report apparatus 7, the diagnostic electric signal outputted to the main loudspeaker 3 is a modulated signal obtained by using a carrier wave having a carrier wave frequency outside the voice band. Therefore, when the main loudspeaker 3 outputs the diagnostic sound representative of the diagnostic electric signal, the diagnostic sound is hardly hearable by the occupant of the vehicle because the diagnostic sound includes a frequency outside the voice band. Consequently, diagnosing the main loudspeaker 3 is unlikely to give an uncomfortable feeling to the occupant of the vehicle.

Furthermore, a component of the diagnostic electric signal that has the carrier wave frequency is used as a carrier wave. Thus, the output level of such a component can be decreased. Consequently, diagnosing the main loudspeaker 3 is more unlikely to give an uncomfortable feeling to the occupant of the vehicle.

Meanwhile, an acoustic noise generated from the surroundings of the vehicle may become loud in a situation where the vehicle is damaged. Therefore, the microphone may fail to detect the diagnostic sound due to the influence of the acoustic noise.

Accordingly, the emergency report apparatus 7 uses a carrier wave frequency (19 kHz in the embodiment) outside the band of the acoustic noise, that is, within the range of 18 kHz to 20 kHz. Therefore, the influence of the acoustic noise can be suppressed when the main loudspeaker 3 is diagnosed.

Further, both the main loudspeaker 3 and the backup loudspeaker 4 are mounted in the vehicle. The selector switch 18 of the emergency report apparatus 7 selects either the main loudspeaker 3 or the backup loudspeaker 4 as the output destination of the voice electric signal representing a voice received from the emergency report center.

Consequently, when the main loudspeaker 3 is determined to be defective, the output destination of the voice electric signal can be changed to the backup loudspeaker 4. This can avoid a situation where the occupant of the vehicle is unable to converse with the operator at the emergency report center.

In the above embodiment, S30 performed by the controller 20 may be referred to as a modulation section or device, or a diagnostic data modulator; S50 performed by the controller 20 may be referred to as a diagnostic data determination section or device, or a diagnostic data determiner; the microphone 2 may be referred to as a voice input instrument; the main loudspeaker 3 and the backup loudspeaker 4 may be collectively referred to as a voice output instrument; and the selector switch 18 may be referred to as a selector.

Second Embodiment

Figure 3:
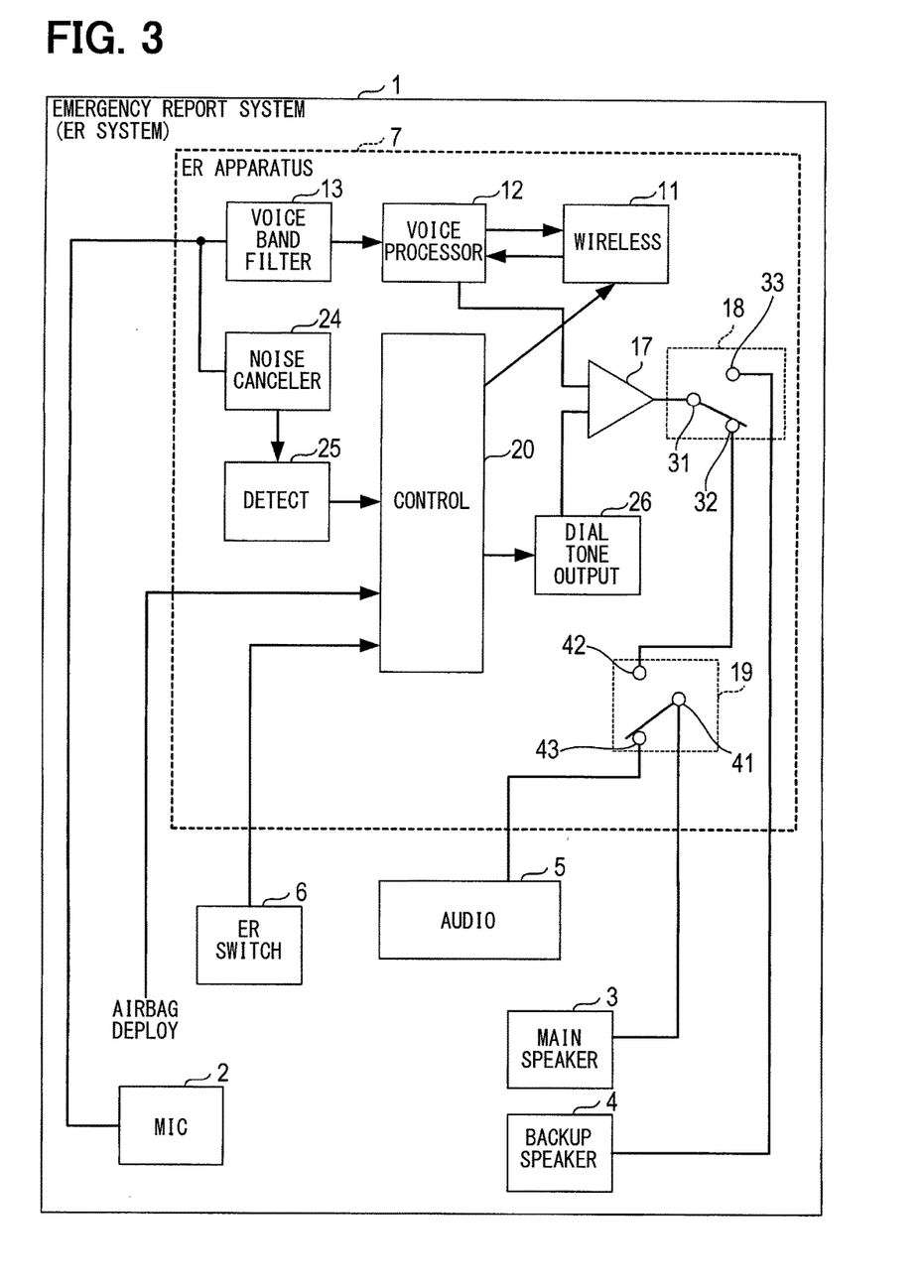
FIG. 3 is a block diagram illustrating a configuration of the emergency report system according to a second embodiment.

A second embodiment of the present disclosure will now be described with reference to the accompanying drawings. The second embodiment will be described by explaining its difference from the first embodiment.

As in FIG. 3, the emergency report system 1 according to the second embodiment differs from the first embodiment in that the carrier wave band filter 14, the demodulator 15, and the modulator 16 are eliminated, and that a noise canceler 24, a detector 25, and a dial tone output instrument 26 are added, and further that the loudspeaker diagnostic process is modified.

The noise canceler 24 eliminates a noise component from the voice electric signal inputted from the microphone 2, and outputs the resultant voice electric signal to the detector 25. The detector 25 attempts to detect a later-described dial tone included in the signal inputted from the noise canceler 24. When the dial tone is detected, the detector 25 outputs, to the controller 20, a dial tone detection signal indicative of the detection of the dial tone.

When a dial tone output command is inputted from the controller 20, the dial tone output instrument 26 generates a voice electric signal for having the occupant of the vehicle recognize that the emergency report apparatus 7 is calling the emergency report center through the wide-area wireless communication network, and outputs the generated voice electric signal to the amplifier 17. The controller 20 continues to output the dial tone output command while calling the emergency report center. The dial tone used in the second embodiment is a signal having a preselected dial tone frequency within the voice band.

The amplifier 17 receives a signal inputted from the voice processor 12 and the dial tone output instrument 26, amplifies the received signal, and outputs the amplified signal. The loudspeaker diagnostic process in the second embodiment is repeatedly executed during an operation of the emergency report apparatus 7.

Figure 4:
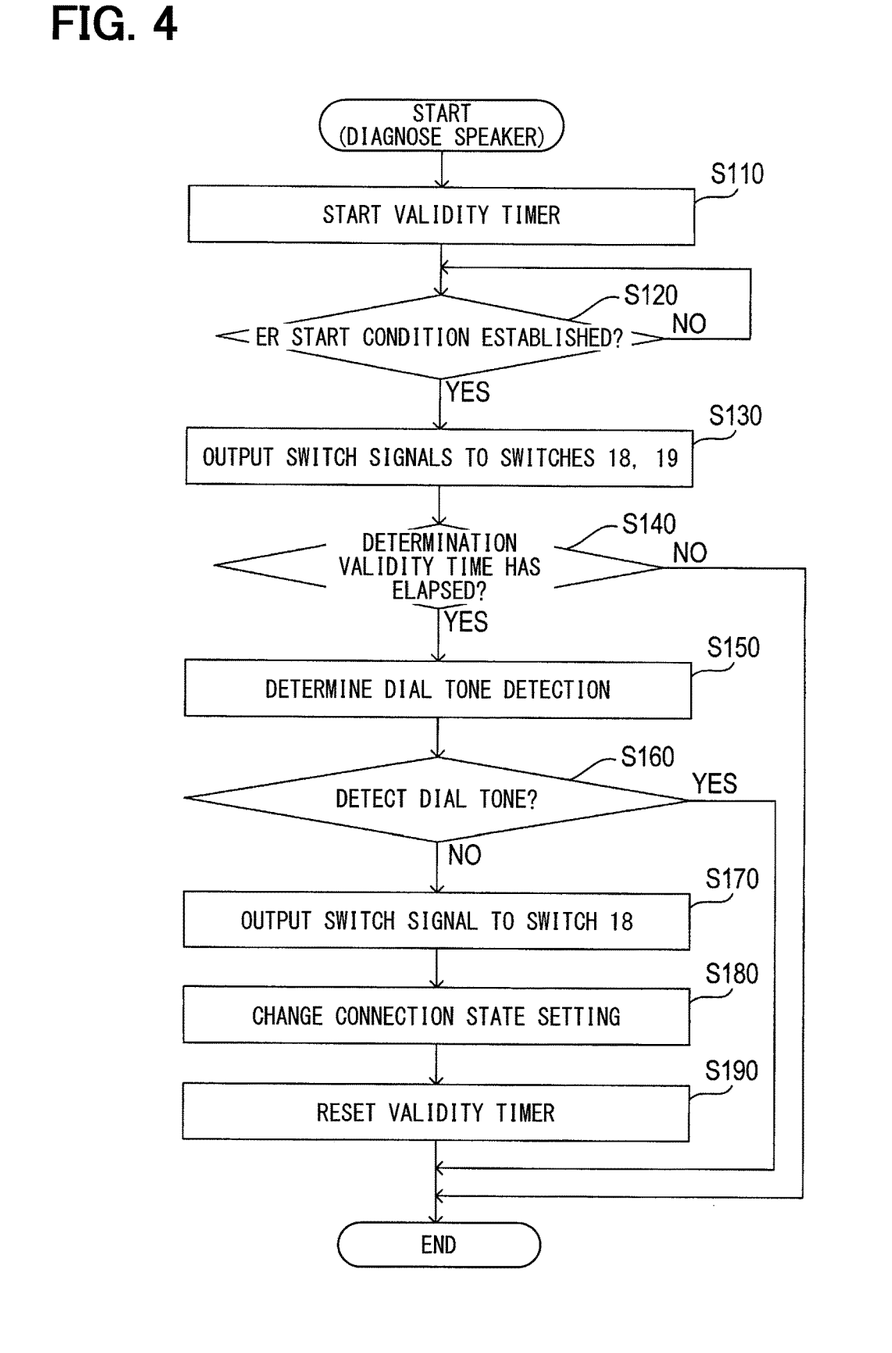
FIG. 4 is a flowchart illustrating the loudspeaker diagnostic process according to the second embodiment.

When the loudspeaker diagnostic process in the second embodiment is executed, the controller 20 first starts a validity timer in S110 as in FIG. 4. In S120, the controller 20 determines whether the emergency report start condition is established, as is the case with S10. If the emergency report start condition is not established (S120: NO), S120 is repeated until the emergency report start condition is established. When the emergency report start condition is established (S120: YES), processing proceeds to S130. In S130, a selection signal indicative of a connection state corresponding to a connection state setting is outputted to the selector switch 18, and a selection signal indicative of the third connection state is outputted to the selector switch 19. The connection state setting is, for example, either 1 or 2. A connection state setting of 1 indicates the first connection state, and a connection state setting of 2 indicates the second connection state. A connection state setting of 1 is initially selected. As described later, the connection state setting can be changed in S180.

In S140, it is determined whether a preselected determination validity time has elapsed since the last loudspeaker diagnosis. In the embodiment, the determination validity time is, for example, 30 minutes. More specifically, when the value of the validity timer is equal to or greater than the determination validity time, it is determined that the determination validity time has elapsed.

If the determination validity time has not elapsed (S140: NO), the loudspeaker diagnostic process terminates. By contrast, if the determination validity time has not elapsed (S140: YES), processing proceeds to S150. In S150, it is determined whether the dial tone is detected. More specifically, it is determined whether the dial tone detection signal is inputted from the detector 25 while the emergency report apparatus 7 is calling the emergency report center. If the dial tone detection signal is inputted, it is determined that the dial tone is detected. By contrast, if the dial tone detection signal is not inputted, it is determined that the dial tone is not detected.

In S160, whether the dial tone is detected is determined based on the result of determination in S150. If the dial tone is detected in S160 (S160: YES), the loudspeaker diagnostic process terminates. By contrast, if the dial tone is not detected (S160: NO), processing proceeds to S170. In S170, a selection signal indicative of a connection state different from the one in S130 is outputted to the selector switch 18. In S180, the connection state setting is changed. More specifically, if a connection state setting of 1 is selected, the connection state setting is changed to 2. If a connection state setting of 2 is selected, the connection state setting is changed to 1. Eventually, in S190, the validity timer is reset, that is, the value of the validity timer is set to 0, and the loudspeaker diagnostic process is terminated.

In the emergency report apparatus 7, while calling the emergency report center in order to let the occupant of the vehicle converse with the emergency report center, the dial tone output instrument 26 outputs a voice electric signal to the main loudspeaker 3 mounted in the vehicle to output a voice. Such a voice electric signal generates a dial tone for having the occupant recognize that the emergency report center is being called. The emergency report apparatus 7 then determines whether the dial tone is included in the voice detected by the vehicle-mounted microphone 2 (25, S150, S160).

The emergency report apparatus 7 can output the dial tone from the vehicle-mounted main loudspeaker 3 by outputting the voice electric signal representative of the dial tone to the main loudspeaker 3. Then, when the vehicle-mounted microphone 2 detects the dial tone, the emergency report apparatus 7 can determine that the main loudspeaker 3 is nondefective.

The dial tone notifies the occupant of the vehicle that the emergency report center is being called, and does not give an uncomfortable feeling to the occupant. The emergency report apparatus 7 therefore reduces the possibility of giving an uncomfortable feeling to the occupant when the main loudspeaker 3 is diagnosed.

Further, both the main loudspeaker 3 and the backup loudspeaker 4 are mounted in the vehicle. The selector switch 18 of the emergency report apparatus 7 selects either the main loudspeaker 3 or the backup loudspeaker 4 as the output destination of the voice electric signal representing a voice received from the emergency report center.

When the main loudspeaker 3 is determined to be defective, the output destination of the voice electric signal can be thus changed to the backup loudspeaker 4. This can avoid a situation where the occupant of the vehicle is unable to converse with the operator at the emergency report center.

Moreover, the noise canceler 24 in the emergency report apparatus 7 eliminates a noise component from a voice detected by the microphone 2. The emergency report apparatus 7 can thus avoid the inability to detect the dial tone in the voice detected by the microphone 2 due to noise generated in the vehicle compartment or around the vehicle.

In the above embodiment, the dial tone output instrument 26 may be referred to as a notification voice output instrument; S150 and S160 performed by the detector 25 and the controller 20 may be referred to as a notification voice determination section or device, or a notification voice determiner; the dial tone may be referred to as a call notification voice; and the noise canceler 24 may be referred to as a noise eliminator.

(First Modification)

For example, the foregoing embodiments assume that one backup loudspeaker 4 is mounted in the vehicle. Alternatively, a plurality of backup loudspeakers 4 may be mounted in the vehicle. Herein, the selector switch 18 should select the main loudspeaker 3 or one of the backup loudspeakers 4 as the output destination of the voice electric signal. Consequently, the controller 20 is allowed to output a selection signal to the selector switch 18 in such a manner that the selector switch 18 sequentially selects the main loudspeaker 3 or one of the backup loudspeakers 4 as the output destination of the voice electric signal. The controller 20 is then able to identify normal loudspeakers by outputting the diagnostic electric signal to each of the main loudspeaker 3 and backup loudspeakers 4. The controller 20 causes the selector switch 18 of the emergency report apparatus 7 to select an identified normal loudspeaker as the output destination of the voice electric signal representative of a voice received from the emergency report center. This can avoid a situation where the occupant of the vehicle is unable to converse with the operator at the emergency report center.

(Second Modification)

The foregoing embodiments assume that the modulator 16 outputs the diagnostic electric signal to the amplifier 17. Alternatively, the diagnostic electric signal may be outputted to the audio instrument 5. Herein, a combination of the diagnostic sound and a different voice (e.g., guidance voice or progress tone) outputted from the audio instrument 5 can be outputted from the main loudspeaker 3. Thus, defect diagnosis can be performed on the main loudspeaker 3 by outputting the diagnostic sound from the main loudspeaker 3 not only in the event of an emergency but also when an audio instrument is built in the vehicle during vehicle manufacture or when music is being reproduced from the main loudspeaker 3. The diagnostic sound is modulated, as described earlier, by using a carrier wave having a carrier wave frequency outside the voice band. Thus, the diagnostic sound is hardly hearable by the occupant of the vehicle. This minimizes the influence of the diagnostic sound upon the sound quality of the voice combined with the diagnostic sound. The diagnostic sound remains unaffected by the voice combined with the diagnostic sound.

(Third Modification)

The foregoing embodiments assume that the loudspeaker diagnostic process is executed to perform defect diagnosis on the main loudspeaker 3. However, defect diagnosis may be performed on the microphone 2 by using a method similar to the one used in the loudspeaker diagnostic process. More specifically, the microphone 2 may be determined to be defective if the loudspeaker diagnostic digital data is not included in the demodulated data in S50 of the loudspeaker diagnostic process (S50: NO). Herein, while a backup microphone is mounted in the vehicle, it is possible to switch to the backup microphone when the microphone 2 becomes defective.

(Fourth Modification)

The second embodiment assumes that the dial tone is outputted to have the occupant of the vehicle recognize that the emergency report center is being called in order to perform the loudspeaker diagnostic process. However, the dial tone may be substituted by a voice for notifying the occupant that the emergency report center is being called, such as an audible guidance message "Calling the Emergency Report Center".

While the present disclosure has been described in conjunction with embodiments, it is to be understood that the present disclosure is not limited to the foregoing embodiments and their structures. The present disclosure is intended to cover various exemplary modifications and equivalent modifications. In addition, various combinations and configurations and other combinations and configurations that additionally include only one element or more than one element or include a smaller number of elements are also within the spirit and scope of the present disclosure.

What is claimed is:

1. An emergency report apparatus that is mounted in a vehicle to establish wireless data communication in an event of an emergency in the vehicle and enable an occupant of the vehicle to converse with an emergency report center, the vehicle including a voice input instrument and a voice output instrument, the emergency report apparatus comprising:

a modulation section that modulates preselected diagnostic data based on a preselected diagnostic modulation method by using a diagnostic carrier wave having a preselected carrier wave frequency that is within a range of frequencies detectable by the voice input instrument and is outside a voice band, and outputs a diagnostic electric signal to the voice output instrument, the diagnostic electric signal being obtained by modulating the diagnostic data;

a demodulator that generates demodulated data by demodulating an input voice electric signal being a voice electric signal representing a voice detected by the voice input instrument based on a preselected diagnostic demodulation method; and a diagnostic data determination section that determines whether the demodulated data generated by the demodulator includes data that matches the diagnostic data.

2. The emergency report apparatus according to claim 1, further comprising:

a plurality of the voice output instruments that are mounted in the vehicle; and a selector that selects one of the voice output instruments as an output destination of a voice electric signal representative of a voice received from the emergency report center.

3. An emergency report apparatus that is mounted in a vehicle to establish wireless data communication in an event of an emergency in the vehicle and enable an occupant of the vehicle to converse with an emergency report center, the vehicle including a voice input instrument and a voice output instrument, the emergency report apparatus comprising:

a notification voice output instrument that outputs a voice electric signal to the voice output instrument while the emergency report apparatus is calling the emergency report center in order to enable the occupant to converse with the emergency report center, the voice electric signal representing a call notification voice adapted to notify the occupant that the emergency report center is being called; and a notification voice determination section that determines whether the call notification voice is included in a voice detected by the voice input instrument or not, thereby determining whether the voice output instrument is nondefective or defective, the notification voice determination section determining that the voice output instrument is nondefective in response to determining that the call notification voice is included in the voice detected by the voice input instrument, whereas determining that the voice output instrument is defective in response to determining that the call notification voice is not included in the voice detected by the voice input instrument.

4. The emergency report apparatus according to claim 3, further comprising:

a plurality of the voice output instruments that are mounted in the vehicle; and a selector that selects one of the voice output instruments as an output destination of a voice electric signal representative of a voice received from the emergency report center.

5. The emergency report apparatus according to claim 3, further comprising:

a noise eliminator that eliminates a noise component from a voice detected by the voice input instrument.

6. The emergency report apparatus according to claim 3, further comprising:

a plurality of the voice output instruments that are mounted in the vehicle; and a selector that selects one of the voice output instruments as an output destination of a voice electric signal representative of a voice received from the emergency report center, wherein:

the plurality of the voice output instruments include a first voice output instrument and a second output instrument different from the first voice output instrument; and in response to that the notification voice determination section determines that the first voice output instrument is defective under a state where the first voice output instrument is selected as the output destination of the voice electric signal representative of the voice received from the emergency report center, the selector changes the output destination from the first output instrument to the second output instrument.

* * * * *